R. B. A. LEMAIGNEN.
SPEEDOMETER.
APPLICATION FILED JUNE 11, 1910.
1,025,070.
Patented Apr. 30, 1912.
4 SHEETS—SHEET 2.
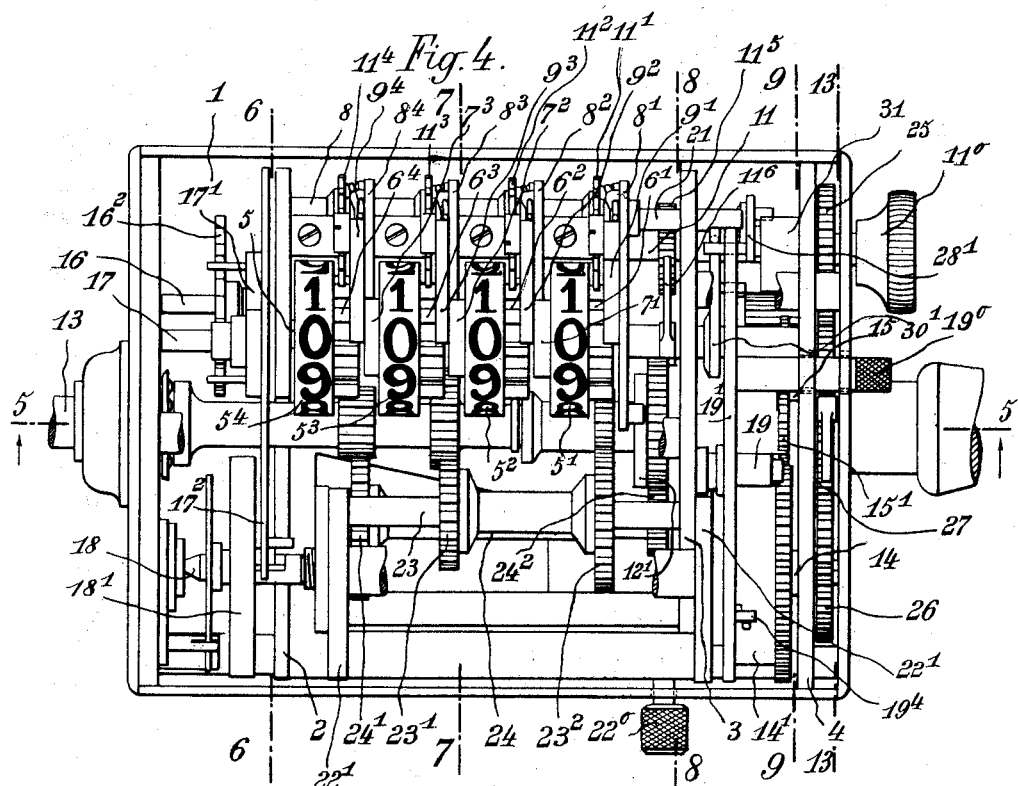
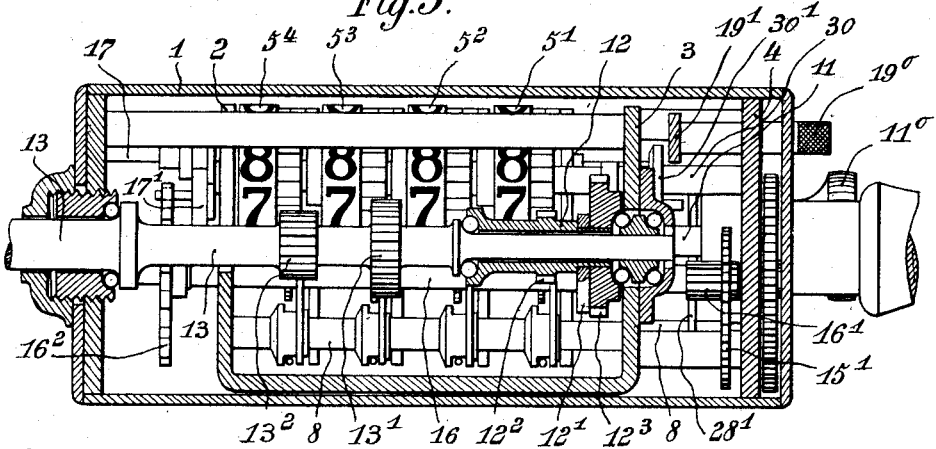

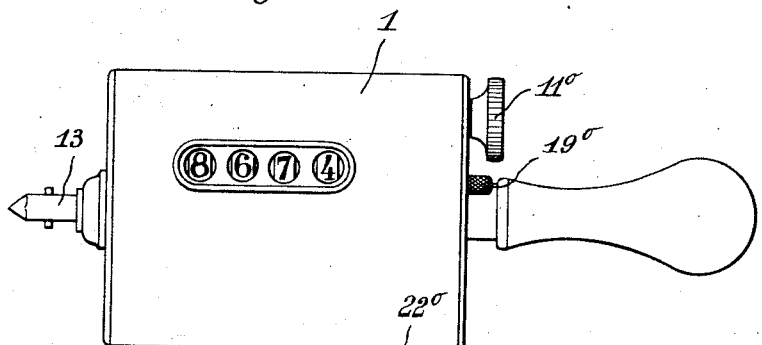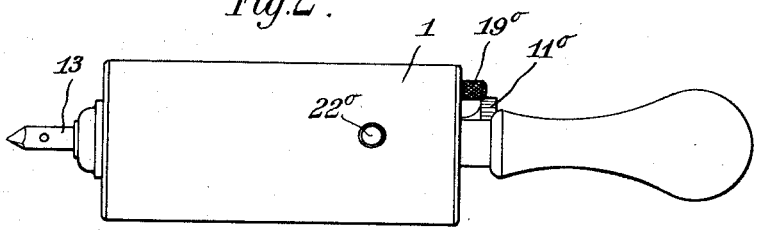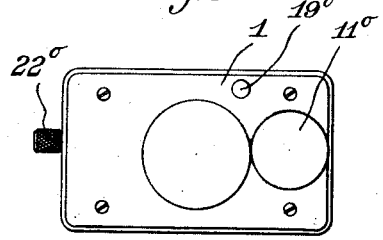

R. B. A. LEMAIGNEN.
SPEEDOMETER.
APPLICATION FILED JUNE 11, 1910.

1,025,070.

Patented Apr. 30, 1912.

Witnesses:

Inventor
Robert B. A. Lemaignen
By

R. B. A. LEMAIGNEN.
SPEEDOMETER.
APPLICATION FILED JUNE 11, 1910.

1,025,070.

Patented Apr. 30, 1912.

4 SHEETS—SHEET 4.

Witnesses:

Inventor
Robert B. A. Lemaignen ness of this machine is owing to the
UNITED STATES PATENT OFFICE.

ROBERT BERTIN AUGUSTE LEMAIGNEN, OF ROUEN, FRANCE.

SPEEDOMETER.

1,025,070.  Specification of Letters Patent.  Patented Apr. 30, 1912.

Application filed June 11, 1910. Serial No. 566,402.

*To all whom it may concern:*

Be it known that I, ROBERT BERTIN AUGUSTE LEMAIGNEN, engineer, a citizen of the French Republic, residing at 30 Rampe St. Hilaire, Rouen, Seine Inféieure, France, have invented certain new and useful Improvements in Speedometers, of which the following is a specification.

This invention relates to speedometers, and more particularly to that type of speedometers in which the combination of the indicating mechanism with a clock train designed to render the latter operable at each actuation only for a predetermined period of time enables said mechanism to directly indicate the real number of revolutions per minute made by a moving part.

It has for its object to simplify and at the same time to improve the construction of speedometers of the above described types and to so construct them that they may be used within very wide limits, (that is to say, for determining comparatively high speeds of rotation, as well as very low speeds of rotation), and, further, that they require no separate operation for winding their clockwork.

To that end, my invention consists in applying to the construction of speedometers devices such as those employed in the counters shown and described in my prior application, Serial No. 490930, filed April 19, 1909 and my prior Patent No. 997068, granted July 4, 1911; also, in combining with the counting mechanism a variable speed gearing by means of which it is possible to modify the conditions under which the movement of the main operating element is transmitted to said mechanism, and, therefore, to lessen strain thereon when it is desired to measure high speeds; and, further, in combining a device for winding the latter with the device for zero-setting the drums of the counting mechanism.

A structural embodiment of the invention is illustrated in the accompanying drawings, whereof—

Figure 10:
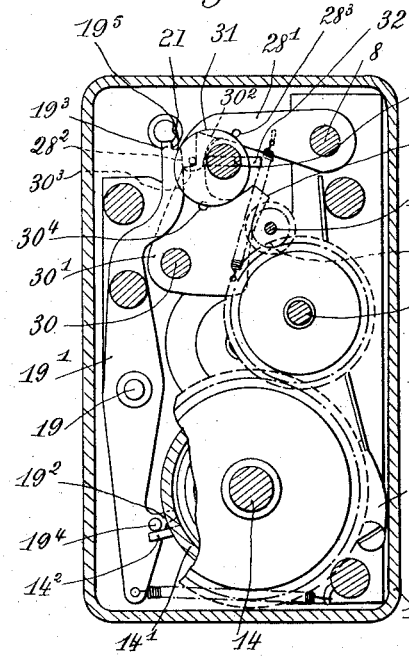
Figure 11:
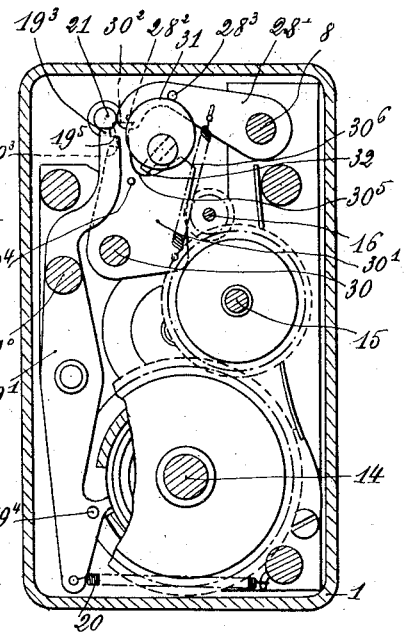
Figure 12:
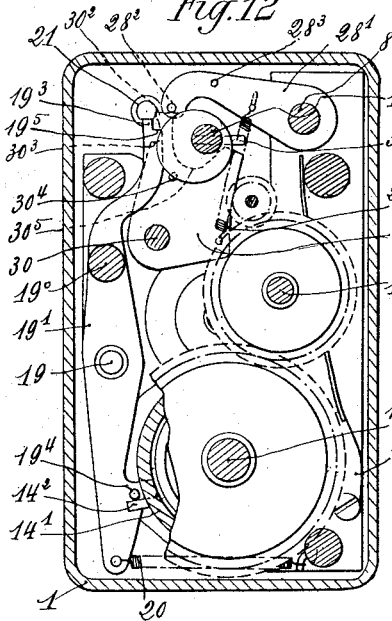
Figure 13:
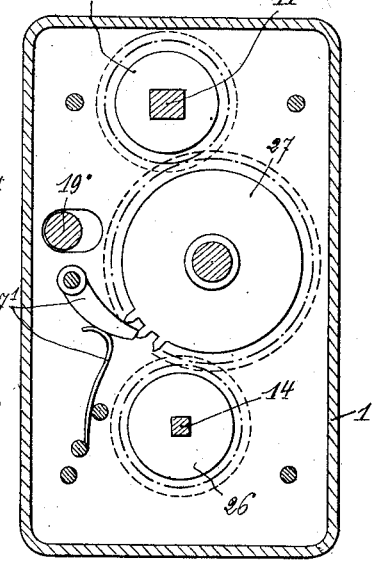

Figures 1 to 3 are, respectively, a plan, side elevation and end view, of the improved speedometer; Fig. 4 is a plan on an enlarged scale with the upper face of the case removed; Fig. 5 is a longitudinal section on line 5—5 of Fig. 4; Fig. 6 is a cross section on line 6—6 of Fig. 4; Fig. 7 is a cross section on line 7—7 of Fig. 4; Fig. 8 is a cross section on line 8—8 of Fig. 4; Fig. 9 is a cross section on line 9—9 of Fig. 4; Figs. 10 to 12 are three views similar to Fig. 9, showing the same parts as the latter, but in different positions; Fig. 13 is a cross section on line 13—13 of Fig. 4.

According to this invention, or, more accurately, according to that construction of the same which is shown in the drawings, the following elements are used for constructing the speedometer: a case 1 is preferably made in the shape of a parallelopiped, the interior of which is divided into four compartments A, B, C and D by means of plates 2, 3 and 4. A mechanism for counting the revolutions, which is arranged in the compartment B and is preferably constituted by four drums $5^1$, $5^2$, $5^3$, $5^4$ loosely mounted on the spindle 5 and provided, respectively, on their right-hand faces with ratchets $6^1$, $6^2$, $6^3$, $6^4$ and on their left-hand faces (excepting the last drum) with spiral cams $7^1$, $7^2$ and $7^3$; four levers $8^1$, $8^2$, $8^3$ and $8^4$ loosely mounted on the spindle 8 and arranged, respectively, beyond the right-hand face of the ratchet $6^1$ and in vertical alinement with the cams $7^1$, $7^2$ and $7^3$, the three levers $8^2$, $8^3$ and $8^4$ being provided with fingers on which the cams in question are adapted to act; four spring-controlled pawls $9^1$, $9^2$, $9^3$ and $9^4$ pivoted to the four levers $8^1$, $8^2$, $8^3$ and $8^4$ in vertical alinement with the said ratchets; four spring-controlled counter-pawls such as that shown at $10^3$ in Fig. 7; and four zero return wheels $11^1$, $11^2$, $11^3$ and $11^4$ that are in the form of ratchets and are keyed to the spindle 11 which is extended beyond the right hand (in the drawings) face of the case 1 and is provided with a milled knob or button $11°$ by means of which it can be rotated. The latter rotation can be effected, in fact, only in one direction, owing to the employment of a ratchet $11^5$ which is mounted on the said spindle 11 and is controlled by a pawl $11^6$. The aforesaid zero-return wheels or ratchets engage the ratchets on the counter-drums. The zero-setting mechanism is as a whole substantially identical with that shown and described in my prior patent already identified. A cam $12^1$ is secured on the main spindle 13 of the counter so as to rotate therewith, said cam being arranged to engage a lateral pin fixed to lever $8^1$, whereby during each revolution it will operate said lever, and, consequently, force the pawl $9^1$ of the latter to act in its turn on the ratchet $6^1$. This actuation of said ratchet will advance the drum $5^1$ one step, while the cam $7^1$ of the said drum $5^1$ operates at the same time the finger of the lever $8^2$, this being done in such a manner that at the end of a complete revolution of the said drum $5^1$ the ratchet $6^2$ of the next higher drum $5^2$ will have been turned one step of the said lever $8^2$, owing to the simultaneous release of the said finger; and so on, along the whole series of drums. A clockwork constituted, for instance, by a barrel $14^1$ arranged in the compartment C, the winding spindle 14 of which projects through the plate 4 into the compartment D; a pinion $15^1$ mounted on a pin 15 and meshing with the teeth of the gear on the said barrel; a pinion $16^1$ meshing with the said pinion $15^1$ and formed at the right hand end of a spindle 16 whose left-hand end extends into the compartment A, at which point it is provided with an escapement wheel $16^2$; an anchor $17^1$ pivoted on a pin 17 and having a downwardly-extending arm $17^2$; a balance wheel $18^1$ controlled by the action of the latter arm and mounted on a pin 18; and a lever $19^1$ located in the compartment C wherein it is loosely pivoted upon a pin 19, said lever being provided adjacent one end with a lug $19^2$ adapted to engage in a mortise formed in the said barrel $14^1$, and, adjacent its other end, with a finger piece $19°$, which latter extends through registering slots in the plate 4 and the adjacent face of the case 1, enabling the said lever $19^1$ to be rocked about its pin 19; the lever in question is, moreover, controlled by a spring 20 whose tension is so exerted thereon as to draw the lug $19^2$ toward the barrel, in order to engage the same in the said mortise at the completion of each revolution of the barrel, said lug being released from the mortise when the finger piece is operated, to permit the rotation of the barrel, as will be understood. And a device, the several objects of which are to hold the pin of the lever $8^1$ out of reach of the cam $12^1$, and, consequently, the counting mechanism at rest, as long as the clockwork is at rest; to bring the said pin within the radius of action of the said cam, at each starting of the clockwork, and consequently to start the said counting mechanism; and, finally, to produce, at the subsequent stoppage of the clockwork, the stoppage of the said counting mechanism. This device is preferably constituted by a forward extension $19^3$ of the lever $19^1$ and by a flat-faced pin 21 located at such a point on the lever $8^1$ that when the latter is raised to its highest position by the cam $12^1$, the said pin 21 is in the position shown in Figs. 10 to 12, that is to say, in such a position that it may be engaged by the upper extremity of the said extension $19^3$, and when the said lever $8^1$ is in its lowest position, the pin is in the position shown in Fig. 9, i. e., beyond the operative end or extremity of the said extension.

As regards the operation of as much of the invention as has been described, it may be stated that, assuming that the parts are in the position shown in Figs. 4 and 12, if the spindle 13 is coupled to a moving part, there will be produced merely an idle rotation of the said spindle and of the cam $12^1$, and if, at that time, the finger piece $19°$ is pressed in the proper direction it will occasion a simultaneous starting of the clockwork and the counter due to the simultaneous disengagement of the barrel $14^1$ and of the pin 21. Then, when the barrel has made a complete revolution and the mortise has returned to its initial position in alinement with the lug $19^2$, the latter will be reëngaged in said mortise by the influence of the spring 20, thereby causing a stoppage of the counter, which is followed almost immediately by the stoppage of the clockwork. To render the stoppage of the barrel more certain after it has completed a revolution, a pair of co-acting stop pins $14^2$ and $19^4$ may be utilized either in addition to or in place of the lug and mortise, the pin $14^2$ being secured to the barrel $14^1$ and the pin $19^4$ to the lever $19^1$, so as to encounter each other at the proper time, as shown in Fig. 12. It will be sufficient, then, assuming that the various parts are properly constructed and arranged, to read the number indicated by the drums of the counter, in order to determine the speed, for instance, in revolutions per minute, at which the part in question was rotating during the time of the observation, that is to say, while the clockwork was in motion, which time is preferably made equal to forty seconds.

The second part of the invention comprehends the provision of means or mechanism whereby greatly varying speeds may be measured. To this end, assuming that the construction hereinbefore described has been adopted, the cam $12^1$ is keyed to a sleeve 12 which is loosely mounted on spindle 13 and has pinions $12^2$ and $12^3$ formed integral therewith or secured thereto; the said spindle is provided with two pinions $13^1$ and $13^2$, and in addition a rocking cage $22^1$ is employed. This cage is pivotally mounted at opposite ends upon a pair of pivots 22 and is provided with a button $22°$ by means of which it can be operated from the outside of the case 1. The right-hand end member of the cage is formed with a ratchet tooth $22^2$ which is interchangeably engaged upon opposite sides thereof by a spring pawl $22^3$, whereby the said cage may be locked in either of the two positions which it is designed to occupy. In the aforesaid cage are mounted two spindles 23 and 24. The first-mentioned spindle carries pinions $23^1$ and $23^2$ arranged to mesh, respectively, with the pinions $13^1$ and $12^2$ when the cage is in one position, while the second spindle is provided with pinions $24^1$ and $24^2$ which mesh, respectively, with the pinions $13^2$ and $12^3$ when the cage is in its other position. The pinions $13^1$, $23^1$, $23^2$ and $12^2$ are so proportioned and arranged as to constitute a speed increasing gear train, while the pinions $13^2$, $24^1$, $24^2$ and $12^3$ are so proportioned and arranged as to constitute a decreasing train.

The invention further covers the provision of means or mechanism for obviating certain difficulties relating generally to the clockwork and the zero-setting devices. As regards this part of the invention, the arrangement is preferably as follows: Within the compartment D, there is mounted on the spindle 11 a pinion 25, and, in the same compartment, on the winding spindle 14 a pinion 26; between these two pinions is interposed an additional pinion 27 with which is associated a spring-controlled pawl $27^1$. The winding of the clockwork being then automatically effected at each return of the counter-drums to zero, it is no longer necessary under any circumstances to wind by hand; provided, however, that the whole mechanism is arranged in such a manner that when the clockwork has been started, it is impossible to throw it again out of gear without having previously returned the counter-drums to zero. To that end, the following devices are preferably used, in addition to those already described. Between the plates 3 and 4 is located a lever $28^1$ which is loosely mounted upon an extension of the spindle 8 and is provided with a pair of lateral pins $28^2$ and $28^3$ arranged, respectively, upon its left- and right-hand faces. This lever is normally drawn downward toward the spindle 11 by the tension exerted upon it by a spring 29, which spring is also connected to a second lever $30^1$ likewise arranged between said plates 3 and 4 and mounted upon a short spindle 30. The pin $28^2$ is designed for engagement at different times, as hereinafter described, by a notch $19^5$ formed in the free end of the extension $19^3$ of lever $19^1$; by the end face of a lug $30^2$ formed on lever $30^1$; and by a notch $30^3$ formed at the base of said lug $30^2$ and facing the notch $19^5$. Lever $30^1$ is also provided with a pin $30^4$ adapted to engage the adjacent edge of the aforesaid extension $19^3$. That portion of the spindle 11 which lies between the above-mentioned plates 3 and 4 is provided with a cam 31, arranged in vertical alinement with the pin $28^3$, so as to operate the same, and also with a pin 32 alining vertically with the lever $30^1$. Pin 32 is designed to be engaged at times by a second lug $30^6$ formed upon lever $30^1$, the latter being recessed between said lugs, as indicated by the character $30^5$, to permit said pin to move therein at other times.

The operation of the parts above described will be understood from a consideration of Figs. 9 to 12, inclusive, which, respectively, depict the position of said parts: during the actuation of the clockwork; at the termination of such actuation and prior to the zero-setting operation; during said zero-setting operation; and at the completion of such operations, all parts being then in their initial position. Referring more especially to Fig. 12, it will be seen that the pin 21 carried by lever $8^1$ is engaged by the end of the extension $19^3$ of lever $19^1$, whereby said lever $8^1$ is held above cam $12^1$ and, hence, in inoperative position with respect thereto; that the pin $28^2$ on lever $28^1$ is engaged by the end face of lug $30^2$ on lever $30^1$ and thus held out of the path of movement of the aforesaid lever extension $19^1$; and that the pin 32 is engaged by the second lug $30^6$ on said lever $30^1$, so that rotation of spindle 11 is prevented. If, therefore, the end of the main spindle 13 be brought into contact with a moving part, said spindle and its cam $12^1$ will merely rotate idly. When the lever $19^1$ is rocked by means of its finger piece $19^0$, the extension $19^3$ will be released from pin 21, the latter and the lever $8^1$ by which it is carried swinging downwardly under the influence of the controlling spring. At the same time, the edge of said extension $19^3$ will strike against pin $30^4$ on lever $30^1$ and will rock said lever to the right into the position shown in Fig. 9, freeing pin $28^2$ from lug $30^2$ and engaging it in notch $19^5$, and, also, shifting lug $30^6$ sufficiently out of the path of pin 32 to permit the latter to move into recess $30^5$, (in other words, permitting the actuation of the zero-setting mechanism). Finally, the rocking of lever $19^1$ has the important result of disengaging stop $19^4$ from stop $14^2$, and lug $19^2$ from the mortise in barrel $14^1$, thus starting the clockwork which continues in motion until the reëngagement of these parts takes place. The above-described downward movement of lever $8^1$ has the obvious effect of bringing it into operative position with relation to cam $12^1$, and the rotations of the main spindle 13 are thus transmitted through said cam and lever to the first counting drum $5^1$ and thence to the other drums at the proper periods, as will be understood. At the conclusion of the action of the clockwork, the pin 21 is in either the position shown in Fig. 10, or in that shown in Fig. 9. In the first instance, said pin rests upon the end of extension $19^3$ and the lever $8^1$ is, in consequence, held in its high or inoperative position, which results in the termination of the actuation of the counting mechanism, while the pin $28^2$ is engaged in the notch $30^3$ and lies directly in front of said extension, thus precluding the finger piece 19⁰ from being operated to rock the starting lever 19¹. In the second instance, the cam 12¹ will continue to operate, even though the clockwork has stopped, until lever 8¹ has been raised thereby high enough to permit the spring 20 to rock lever 19¹ slightly backward and engage the end of its extension 19³ beneath the then elevated pin 21, the pin 28² occupying the same position as in the former case. The zero-setting mechanism is then operated by rotating the knob or button 19⁶ until all of the drums are by the interengagement of the zero-return wheels or ratchets with the ratchets on said drums zeroized, during which operation the cam 31 on spindle 11 engages pin 28³ and raises lever 28¹ as shown in Fig. 11, while at the same time lever 30¹ is rocked slightly toward the left, (forward). At the completion of this operation, all of the parts occupy their original position shown in Fig. 12, pin 32 engaging lug 30⁶, and pin 28² engaging lug 30². The device is then again ready for use, since the zero-setting operation effects the re-winding of the clockwork, due to the intermeshing of the pinions 25, 27 and 26.

Further description of the invention and its mode of operation is considered as unnecessary, it being understood, however, that no limitation as to the specific construction mentioned is intended, as modifications and changes may well be made within the scope of the appended claims.

I claim as my invention:

1. The combination of a rotatable element; counting mechanism operatively connected therewith; a clock train for limiting the period of operation of the counting mechanism including a rotatable main element; zero-setting mechanism connected with said counting mechanism including a rotatable main element; and a gear train connecting the main element of said zero-setting mechanism with the main element of said clock-train, for winding the clock-train when the zero-setting mechanism is operated.

2. The combination of a rotatable element; counting mechanism operatively connected therewith and comprising a series of drums, a spring-controlled lever for operating the head drum, and carrying devices between said drum and the remaining drums; a clock train for limiting the period of operation of the counting mechanism, including a barrel; and a controlling lever having one of its ends arranged to normally support the first-named lever in inoperative position, the other end of said controlling lever and said barrel being provided with co-acting means for normally holding the latter against rotation and for terminating such rotation.

3. The combination of a rotatable element; counting mechanism operatively connected therewith and comprising a series of drums, a spring-controlled lever for operating the head drum, and carrying devices between said drum and the remaining drums; a clock train for limiting the period of operation of the counting mechanism including a barrel; a controlling lever for said clock train arranged to normally hold the first-named lever in inoperative position; zero-setting mechanism connected with said counting mechanism; and a gear train connecting said barrel and said zero-setting mechanism for winding the clock train during the operation of the last-named mechanism.

4. The combination of a rotatable element; counting mechanism operatively connected therewith; a clock train for limiting the period of operation of the counting mechanism including a barrel; a controlling lever for said clock train; zero-setting mechanism connected with said counting mechanism; and a gear train connecting said barrel and said zero-setting mechanism for winding the clock train during the operation of the last-named mechanism.

5. The combination of a rotatable element; counting mechanism operatively connected therewith; zero-setting mechanism connected with said counting mechanism; and means for preventing subsequent operation of the counting mechanism when once operated until after the zero-setting mechanism has been operated.

6. The combination of a rotatable element; counting mechanism operatively connected therewith; a clock train for limiting the period of operation of the counting mechanism; zero-setting mechanism connected with said counting mechanism; a controlling lever for said clock train; and means for preventing subsequent operation of said lever when once operated until after the zero-setting mechanism has been operated.

7. The combination of a rotatable element; counting mechanism operatively connected therewith; zero-setting mechanism connected with said counting mechanism; means normally engaged with said zero-setting mechanism for holding the same against operation; and controlling means for said counting mechanism arranged to release said holding means from such engagement.

8. The combination of a rotatable element; counting mechanism operatively connected therewith; a controlling lever for said counting mechanism; means arranged to engage said lever after the same has been operated, to hold it against subsequent operation; zero-setting mechanism; and means carried by said zero-setting mechanism for releasing said holding means during its operation.

9. The combination of a rotatable element; counting mechanism operatively connected therewith; a controlling lever for said counting mechanism; a spring-controlled member arranged to engage said lever after the same has been operated, to hold it against subsequent operation; zero-setting mechanism; and means carried by said zero-setting mechanism for releasing said member during its operation.

10. The combination of a rotatable element; counting mechanism operatively connected therewith; a controlling lever for said counting mechanism; a spring-controlled member provided with a pair of pins, one of which is arranged to engage said lever after the same has been operated, to hold it against subsequent operation; zero-setting mechanism; and a cam carried by said zero-setting mechanism and arranged during its operation to engage the other pin on said member, for raising the latter, to release the first-named pin.

11. The combination of a rotatable element; counting mechanism operatively connected therewith; a controlling lever for said counting mechanism; a spring-controlled member arranged to engage said lever after the same has been operated, to hold it against subsequent operation; zero-setting mechanism; and means for raising said member during the operation of the zero-setting mechanism to release it from such engagement.

12. The combination of a rotatable element; counting mechanism operatively connected therewith; zero-setting mechanism connected with said counting mechanism; a member normally engaged with the zero-setting mechanism for holding the same against operation; and a controlling lever for said counting mechanism arranged to shift said member out of such engagement, to permit the operation of said zero-setting mechanism.

13. The combination of a rotatable element; counting mechanism operatively connected therewith; zero-setting mechanism connected with said counting mechanism and provided with a projection; a spring-controlled member having a portion thereof normally engaged with said projection for holding the zero-setting mechanism against operation; and a controlling lever for said counting mechanism arranged to shift said member in one direction, to remove said portion from the path of said projection.

14. The combination of a rotatable element; counting mechanism operatively connected therewith; zero-setting mechanism connected with said counting mechanism; means for normally holding said zero-setting mechanism against operation; a controlling lever for said counting mechanism arranged during its operation to release said holding means; holding means arranged to engage said lever after the latter has been operated; and means carried by said zero-setting mechanism for releasing the second-named holding means.

15. The combination of a rotatable element; counting mechanism operatively connected therewith; zero-setting mechanism connected with said counting mechanism; a spring-controlled member normally engaged with the zero-setting mechanism for holding the same against operation; a controlling lever for said counting mechanism arranged during its operation to shift said member in one direction for disengaging it; a second spring-controlled member arranged to engage said lever after the latter has been actuated; and means carried by said zero-setting mechanism for disengaging the second-named member.

16. The combination of a rotatable element having a sleeve loosely fitted thereon; counting mechanism operatively connected with said sleeve; a rocker; interchangeable gearing carried by said rocker arranged to engage said element and said sleeve for driving the latter from the former and for varying its speed; means for moving said rocker; and means for holding said rocker in adjusted position.

17. The combination of a rotatable element, and a sleeve fitted loosely thereon, said element and sleeve being each provided with a pair of gears; counting mechanism operatively connected with said sleeve; a rocker provided with a pair of shafts arranged parallel with each other and with said element and sleeve; a pair of gears mounted on each shaft; and means for shifting said rocker in either direction, to bring the gears on either of said shafts into mesh with a gear on said element and a gear on said sleeve.

In testimony whereof I have hereunto set my hand in presence of two subscribing witnesses.

ROBERT BERTIN AUGUSTE LEMAIGNEN.

Witnesses:
H. C. COXE,
ARMAND MARX.

---

Copies of this patent may be obtained for five cents each, by addressing the "Commissioner of Patents, Washington, D. C."